United States Patent
Kobayashi et al.

[11] Patent Number: 6,119,748
[45] Date of Patent: Sep. 19, 2000

[54] PNEUMATIC TIRES WITH SPECIFIED STIFFENER RUBBER ARRANGEMENT

[75] Inventors: Kazuomi Kobayashi, Higashimurayama; Tomohisa Nishikawa; Kenji Matsuo, both of Kodaira, all of Japan

[73] Assignee: Bridgestone Corporation, Tokyo, Japan

[21] Appl. No.: 09/302,984

[22] Filed: Apr. 30, 1999

[30] Foreign Application Priority Data

Apr. 30, 1998 [JP] Japan ................................. 10-121421

[51] Int. Cl.[7] .......................... B60C 15/00; B60C 17/00; B60C 13/00
[52] U.S. Cl. ......................... 152/539; 152/517; 152/546; 152/552; 152/555; 152/556
[58] Field of Search ........................ 152/517, 555, 152/552, 556, 539, 546

[56] References Cited

U.S. PATENT DOCUMENTS 4,193,437  3/1980  Powell .................................... 152/517

Primary Examiner—Adrienne C. Johnstone
Attorney, Agent, or Firm—Sughrue, Mion, Zinn, Macpeak & Seas, PLLC

[57] ABSTRACT

In a pneumatic tire for run-flat running comprising a stiffener rubber, viewing a cross-section of the tire-rim assembly inflated under an air pressure corresponding to 15% of a maximum air pressure of the tire, a top of the stiffener rubber is located inward from a specified line segment PA in a radial direction of the tire.

6 Claims, 10 Drawing Sheets

FIG_2

Longitudinal direction of cord

—15mm—

Longitudinal direction of cord

—15mm—

FIG_5
PRIOR ART

FIG_6  PRIOR ART

FIG_9
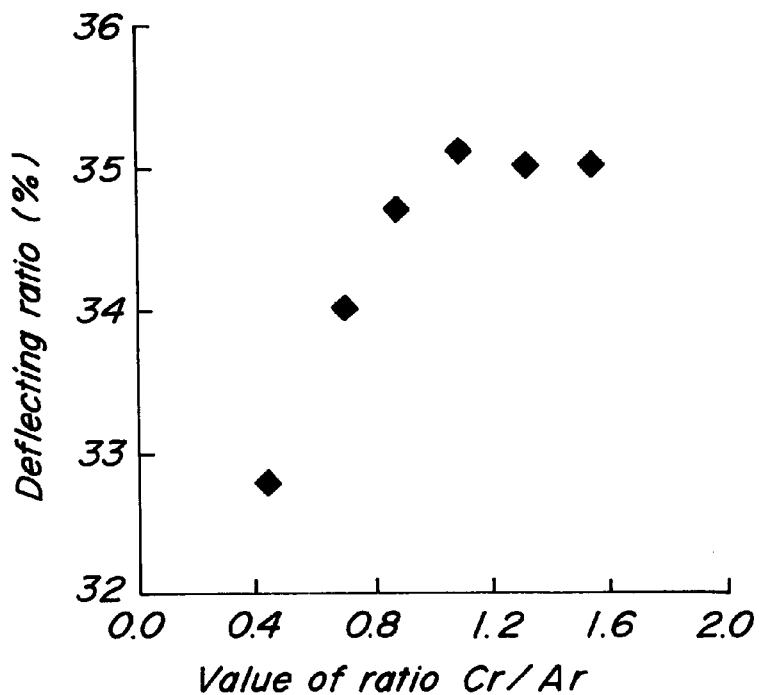
FIG_10
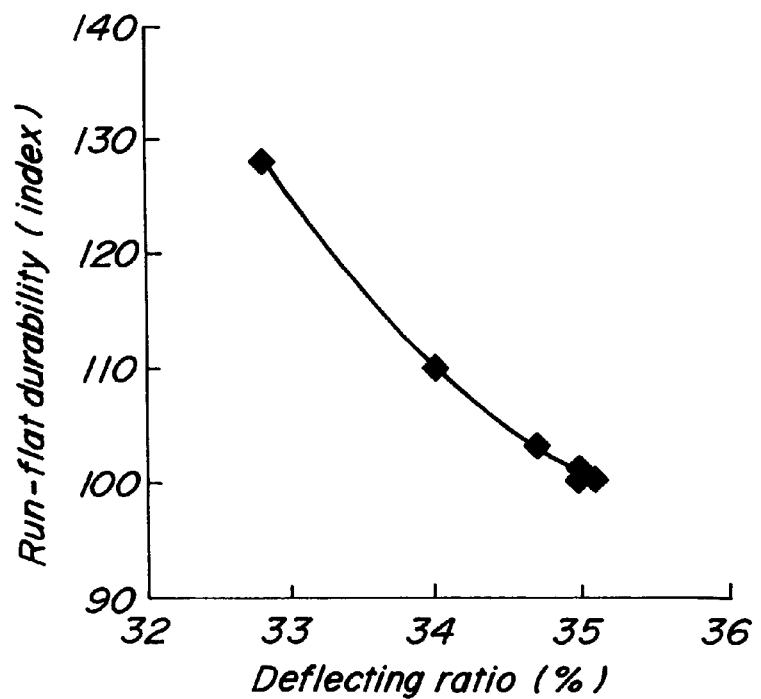

FIG_11
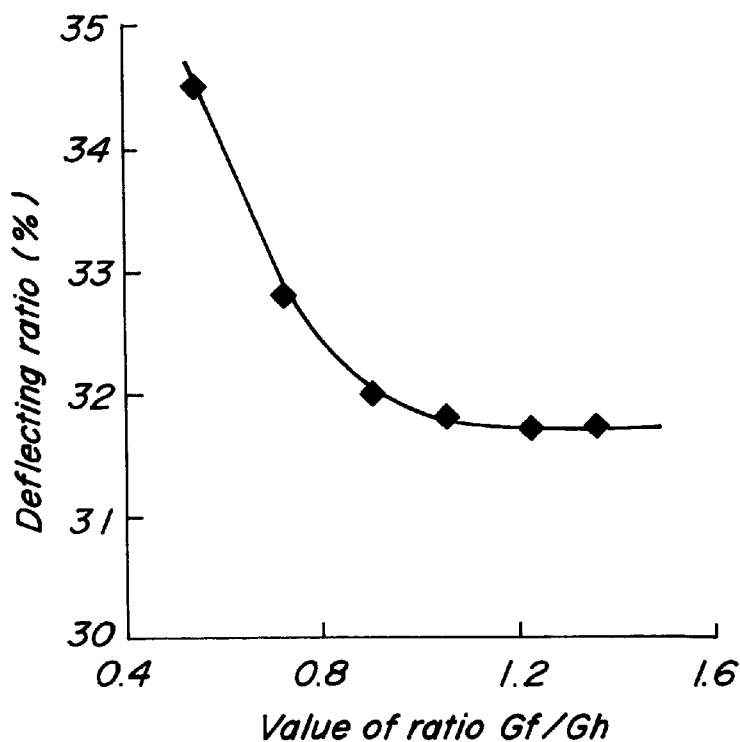
FIG_12
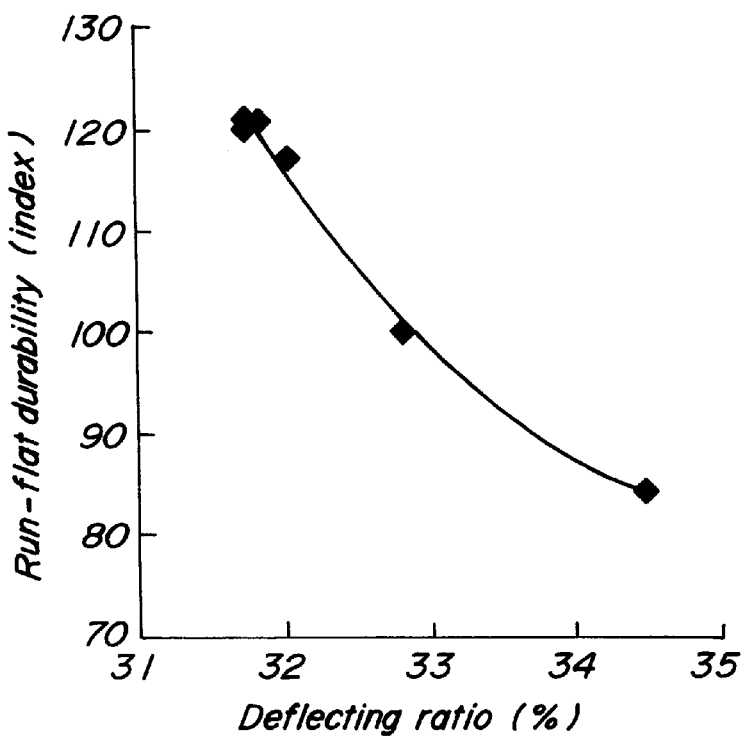

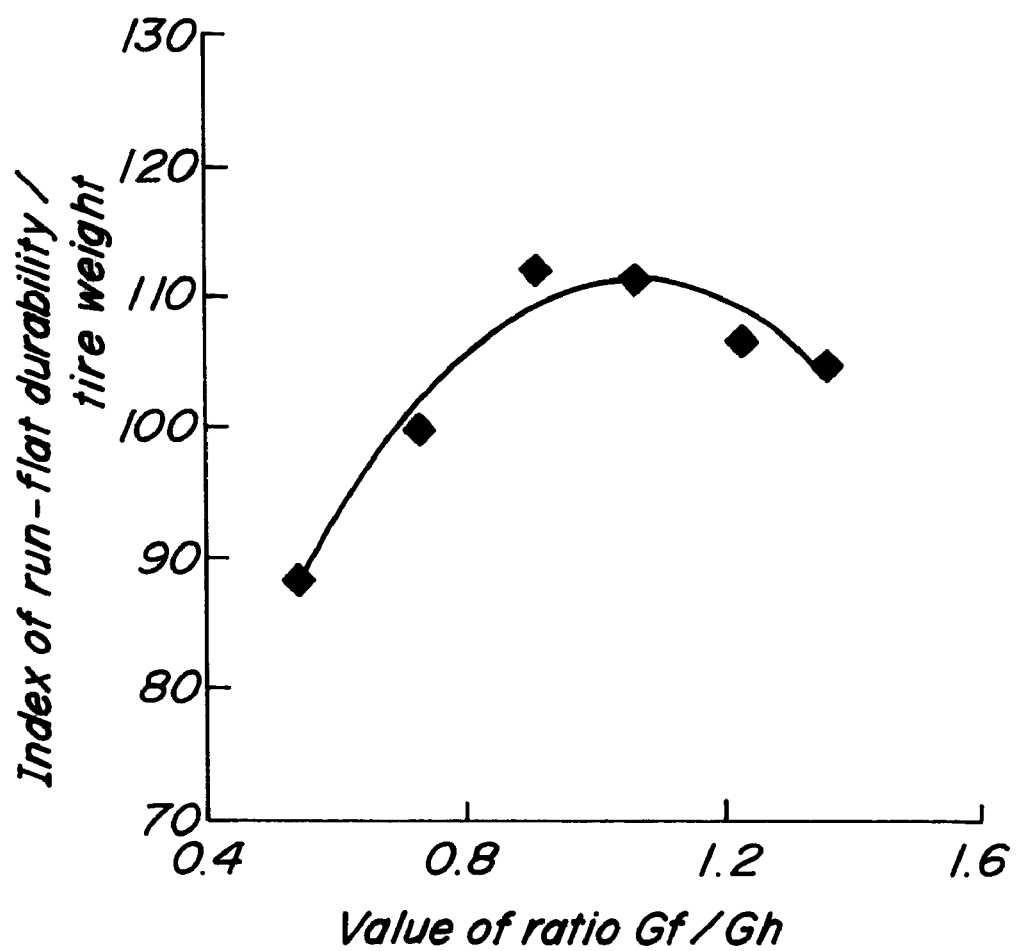
FIG_13

PNEUMATIC TIRES WITH SPECIFIED STIFFENER RUBBER ARRANGEMENT

BACKGROUND OF THE INVENTION

1. Filed of the Invention

This invention relates to a pneumatic tire, and more particularly to a pneumatic radial tire of so-called run-flat type capable of running over a given distance at a state that an inner pressure is zero or neat to zero due to puncture or the like. Particularly, the invention relates to a pneumatic radial tire having a relatively large ratio of section height to section width or an aspect ratio of not less than 60 and an excellent run-flat durability (running at puncture state).

2. Description of Related Art

The run-flat type radial tire (hereinafter referred to as run-flat tire) is mainly applied to vehicles such as passenger cars and the like wherein the bearing load of the tire is relatively small, and is required to satisfy a condition that even if the tire is suddenly rendered into a flat state (or puncture state) during running on general-purpose road or high-speed running on an expressway, it can stably be run without damaging the handling stability of the vehicle or the passenger car location. Particularly the tire can stably and surely be run up to a tire exchangeable over a given distance of, for example, 80–160 km without separating off from a used rim (or approved rim) and causing breakage even in the continuation of the running.

For this end, run-flat tires having various structures are proposed or sometimes in a combination of a fully worked-out rim to be used. The tires relating to these proposals are roughly divided into super-low section profile tires having an aspect ratio of less than 60 and tires having an aspect ratio of not less than 60 and being relatively high in the section height.

As to the super-low section profile tires, an example of a run-flat tire excellent in the cost performance and most practically used in markets is a tire having a structure that as a section of a tire 21 is shown in FIG. 5, a pair of thick reinforcing rubber strips 29 each having a crescent-shaped section are applied to an inner face side of an innermost carcass ply 26-1 extending from a bead portion 22 through a sidewall portion 23 to an end part of a tread portion 24. However, this type of the tire cannot avoid the rise of the cost, so that it is frequently mounted onto an expensive vehicle assuming high-speed running such as a sport car, a sport-type car and the like.

In the tire 21 having the thick reinforcing rubber strips 29, a radial carcass 26 has a two or more ply structure comprising a turnup ply 26-1 wound around a bead core 25 from inside of the tire toward outside and a down ply 26-2 enveloping the turnup ply 26-1 from the outside in order to mitigate a deformation degree crushed under flat running as far as possible. Also, a hard stiffener rubber 27 extending from an outer peripheral surface of the bead core 25 up to a position near a maximum tire width S is arranged so as to sandwich between the turnup ply 26-1 and the down ply 26-2. Further, a rubberized layer containing Kevlar cords or steel cords therein (called as an insert ply) is sometimes arranged so as to extend from the bead portion 22 to the sidewall portion 23.

Recently, tires having a relatively high section height as mentioned above are frequently mounted onto high-grade import passenger cars and high-grade domestic passenger cars having a relatively large displacement. In this case, it is possible to run the tire in cooperation with an installed rim at a run-flat state. A type rim type incorporating a tire support member into the rim is main.

In the tire having the structure shown in FIG. 5, in order to improve the durability in the run-flat running, there are proposed and practiced a method of increasing the thickness or height of the reinforcing rubber strip 29, a method of largely increasing the hardness or modulus of rubber itself and the like. In these methods, however, there are restrictions in the production, restriction on the rising breadth of the cost and the like. Therefore, when the inner pressure of the tire is suddenly reduced to zero, it is particularly necessity to ensure the handling stability of the vehicle during the high-speed running and also the durability in the continuation of the running at the run-flat state in this tire handling and durability is not sufficient, so that it is desired to develop a tire ensuring these performances and improving the run-flat durability.

In case of incorporating the tire support member into the rim, the assembling of the tire onto a wheel is not easy or there is caused a problem in so-called rim assembling property. Also, it is unavoidable to largely increase the weight in the tire-wheel assembly and the unsprung mass of the vehicle is highly increased to considerably degrade the ride comfort of the vehicle against vibrations. Therefore, there is raised a problem that the above incorporation of the tire support member is unsuitable for the high-grade passenger car.

SUMMARY OF THE INVENTION

It is, therefore, an object of the invention to provide a pneumatic tire having particularly an aspect ratio of not less than 60 in which the safe running of the vehicle such as passenger car or the like is guaranteed even if rapid air leakage is caused due to puncture or the like while maintaining the good rim assembling property and the ride comfort against vibrations within an acceptable range without bringing about inconvenience in the production and remarkable cost rise and the performance of preventing the separation of the tire from the rim in the run-flat running and the durability are improved to a level satisfied by a user as a run-flat tire.

According to the invention, there is the provision of a pneumatic tire comprising a radial carcass of at least one rubberized cord ply extending between a pair of bead cores embedded in a pair of bead portions and reinforcing a pair of sidewall portions and a tread portion, a stiffener rubber taperingly extending from an outer peripheral surface of the bead core toward the tread portion, said carcass comprising a turnup ply wound around the bead core from inside of the tire toward outside thereof so as to envelop the stiffener rubber, and a pair of reinforcing rubber strips each having a crescent-shaped cross-section and extending along an inner face side of an innermost turnup ply from a position near to the bead core in the bead portion through the sidewall portion to an end part of the tread portion, the improvement wherein at a cross-section of a tire-rim assembly when the tire is assembled onto an approved rim and inflated under an internal pressure corresponding to 15% of a maximum air pressure for the tire, a top of the stiffener rubber is located inward in a radial direction of the tire from a line segment PA connecting a center P of an arc in a flange profile of the rim to an intersection point A of a straight line drawn from the center P toward the tire at an angle of 60° with respect to a straight line parallel to a rim diameter line with an inner face of the tire.

The terms "maximum air pressure" and "approved rim" used herein are according 1998 YEAR BOOK of the Tire and Rim Association Inc. (hereinafter referred to as TRA standard). More precisely, there are used numerical values and rim size described on "Table of air pressure—load capacity" and "Table of approved rim" defined every kind of tires according to TRA standard.

Further, the wording "assembling of tire onto approved rim" means an assembled state that the tire assembled onto the approved rim is inflated under an air pressure above the maximum air pressure to sufficiently assemble the tire onto the approved rim and then the filled air or gas is discharged to an internal pressure of zero while holding the sufficiently assembled state. Alternatively, the discharge of filled air may be adjusted to a pressure corresponding to 15% of the maximum air pressure before decreasing to an internal pressure of zero. Also, the term "rim diameter line" means a straight line parallel to a rotating axis of the tire in an actual value of a rim diameter ($\phi D$) on each approved rim described in a chapter "Rim Profile" of the TRA standard.

In preferable embodiments of the invention, a cord at least used for the turnup ply of the carcass is a steel cord, and a turnup portion of the turnup ply is contacted with a main body of the turnup ply inward from the line segment PA in the radial direction of the tire, and the turnup portion of the turnup ply extends over the top of the stiffener rubber and is contacted with the main body of the turnup ply at a position exceeding the top of the stiffener rubber. Moreover, the term "main body of the turnup ply" as used herein means a portion of the turnup ply other than the turnup portion and extending between the bead cores.

In the other preferable embodiments of the invention, the steel cord for the turnup ply has a cord twisting structure of 1×n where n is an integer of from 2–7, and a filament diameter of the steel cord is within a range of 0.125–0.275 mm, and a ratio of rubber gauge Gf between an outer surface of the tire and an outer surface of an outermost ply on the line segment PA to maximum gauge Gh of the reinforcing rubber strip (Gf/Gh) is within a range of 0.8–1.4.

BRIEF DESCRIPTION OF THE DRAWINGS

The invention will be described with reference to the accompanying drawings, wherein:

FIG. 9 is a graph showing a relation between a ratio Cr/Ar and deflecting ratio;

FIG. 10 is a graph showing another relation between deflecting ratio and run-flat durability;

FIG. 11 is a graph showing a relation between a ratio Gf/Gh and deflecting ratio;

FIG. 12 is a graph showing the other relation between deflecting ratio and run-flat durability; and FIG. 13 is a graph showing a relation between a ratio Gf/Gh and run-flat durability/tire weight.

DESCRIPTION OF PREFERRED EMBODIMENTS

Figure 1:
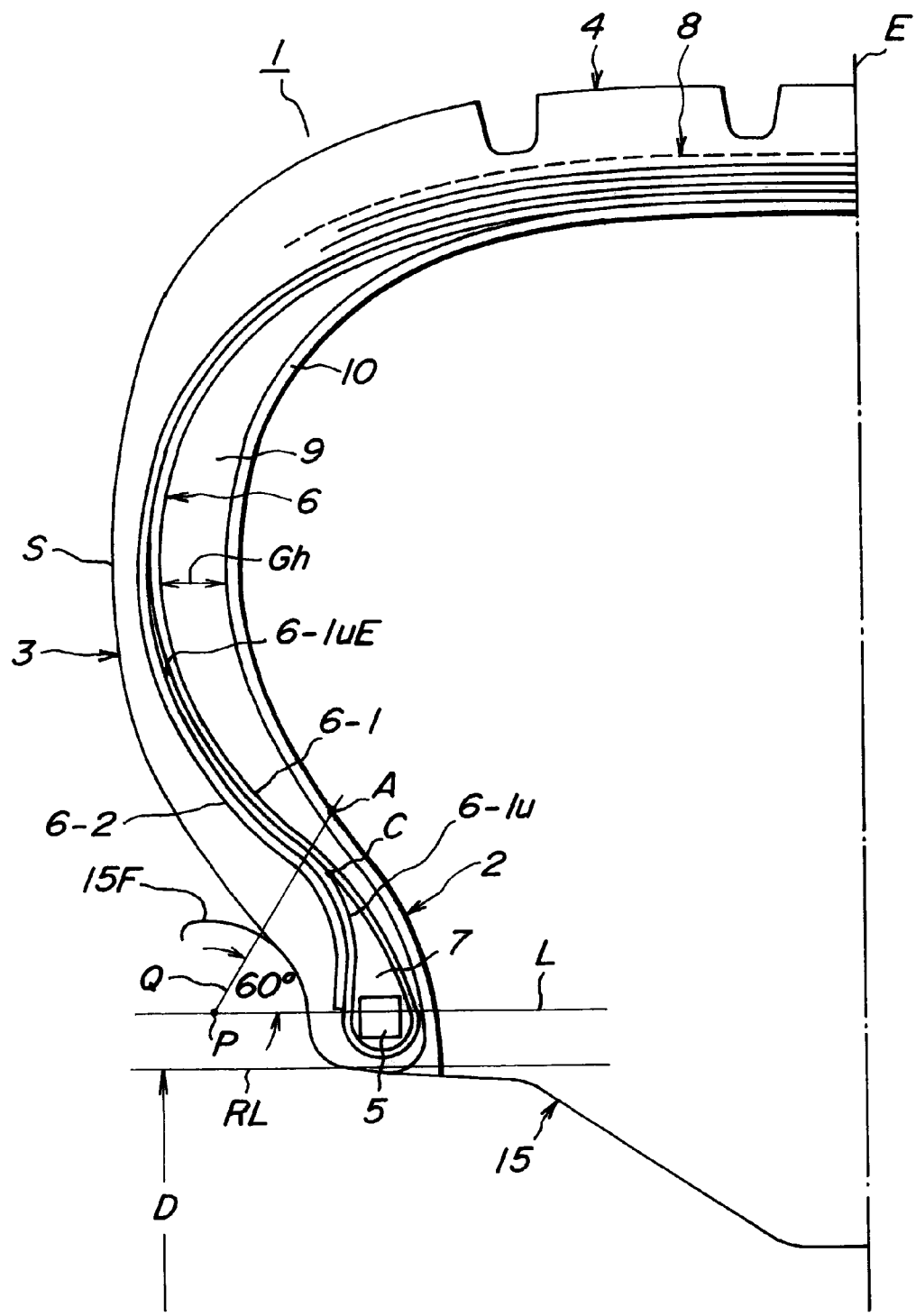
FIG. 1 is a left-half section view of an assembly of an embodiment of the pneumatic tire according to the invention with a rim.
Figure 2:
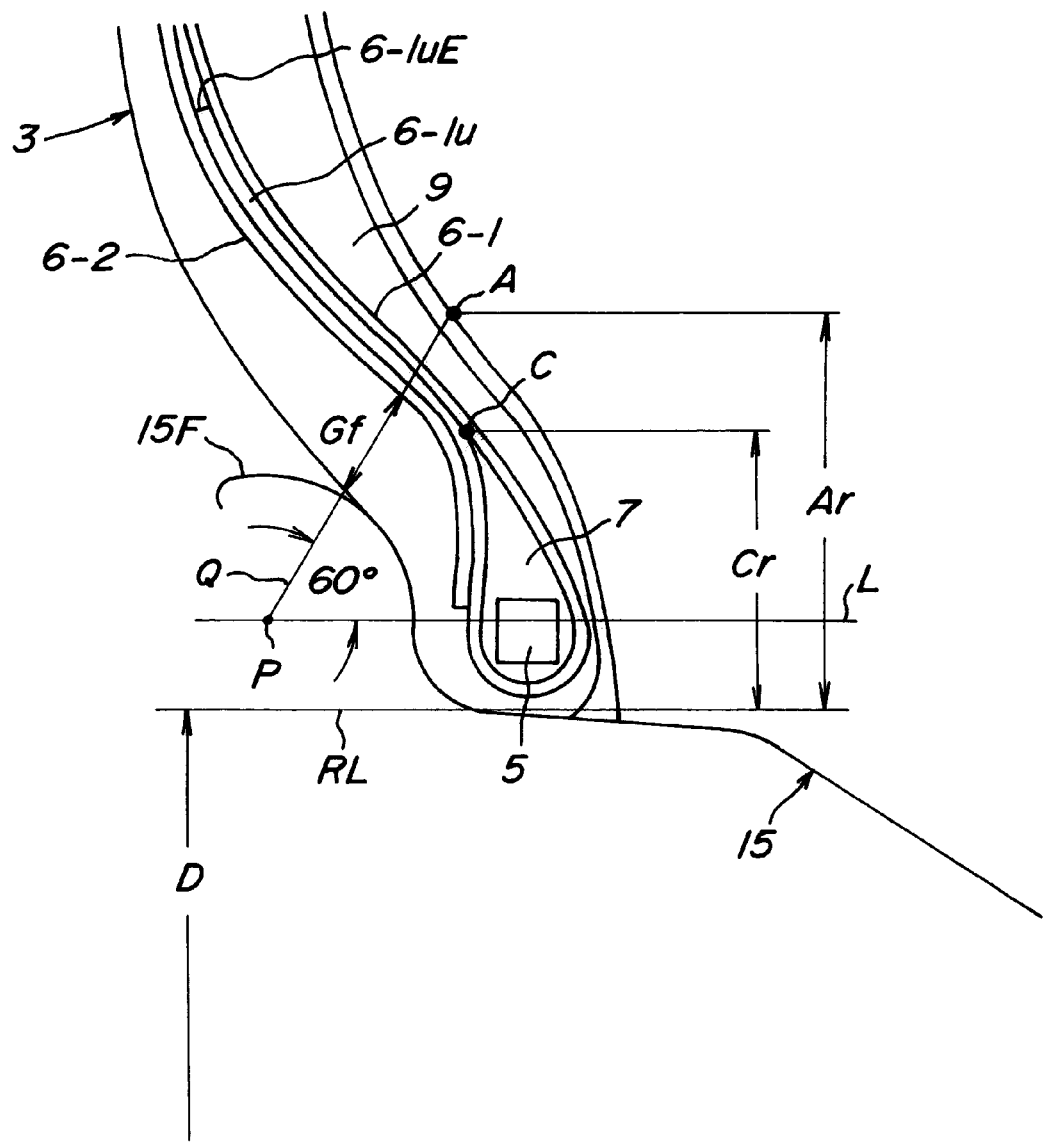
FIG. 2 is an enlarged section view of a main part of the assembly shown in FIG. 1.
Figure 3:
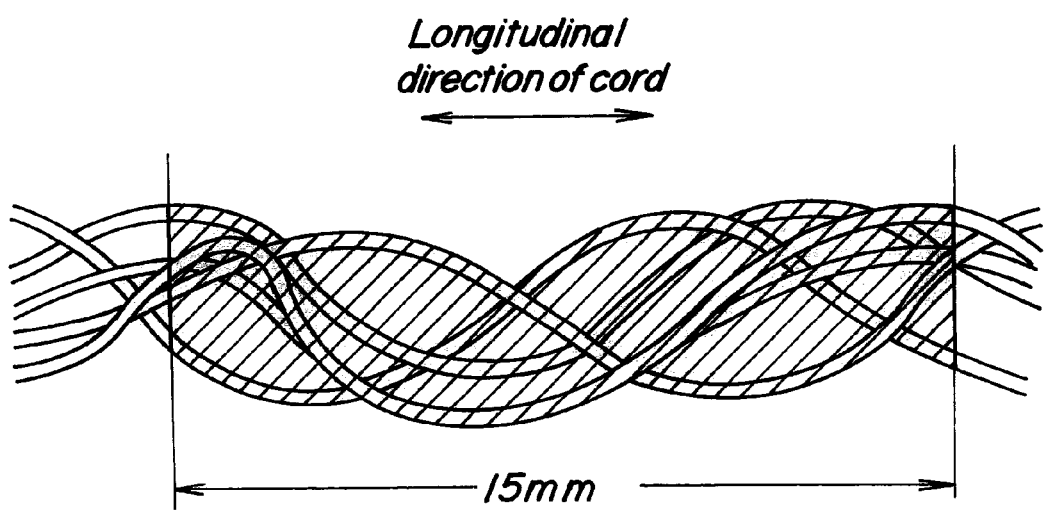
FIG. 3 is an X-ray photograph schematically illustrating one rubberized steel cord used for a carcass ply.
Figure 4:
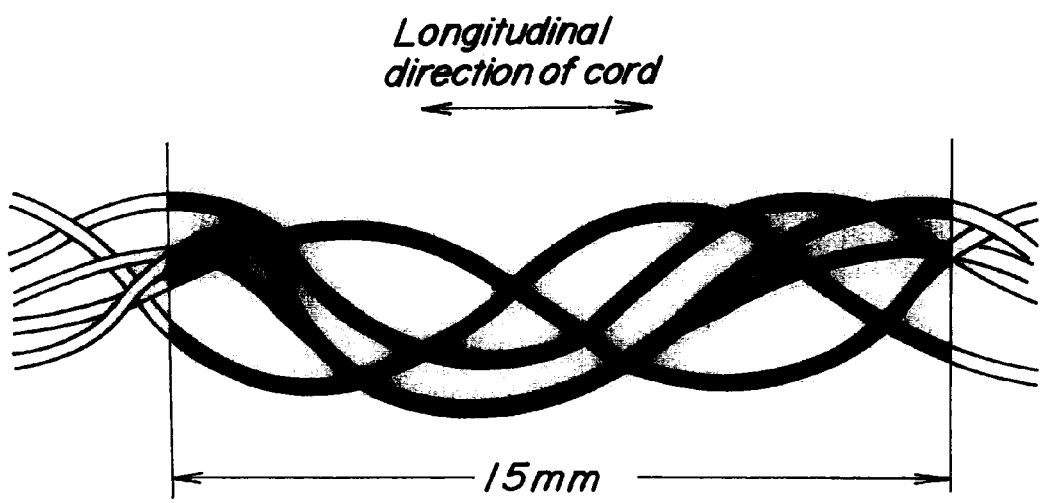
FIG. 4 is an X-ray photograph schematically illustrating only a steel cord excluding rubber shown in FIG. 3.

An embodiment of the invention will be described with reference to FIGS. 1–4. In FIG. 1 is shown an tire-rim assembly formed by assembling the pneumatic tire according to the invention into an approved rim, and FIG. 2 is an enlarged section view of a main part shown in FIG. 1, and FIG. 3 is a diagrammatically X-ray photograph of a rubberized steel cord used for a carcass ply in the tire, and FIG. 4 is a diagrammatically X-ray photograph of only a steel cord excluding rubber shown in FIG. 3.

In FIG. 1, numeral 1 is a pneumatic tire for a passenger car. The tire 1 comprises a pair of bead portions 2, a pair of sidewall portions 3, a tread portion 4 connecting to both the sidewall portions 3, and a radial carcass 6 of one or more rubberized cord plies, two plies in the illustrated embodiment extending between a pair of bead cores 5 embedded in the bead portions 2 and reinforcing the portions 2, 3, 4.

The carcass 6 of the illustrated embodiment comprises a turnup ply 6-1 wound around the bead core 5 from inside of the tire toward outside thereof to form a turnup portion 6-1u having a turnup end 6-1uE, and a down ply 6-2 enveloping a main body of the turnup ply 6-1 and the turnup portion 6-1u from outside and terminated in the vicinity of the bead core 5. In the carcass 6 of the illustrated embodiment, the turnup ply 6-1 forms an innermost carcass ply. Moreover, the carcass 6 may comprise only the turnup ply 6-1 without using the down ply 6-2.

The tire 1 has a stiffener rubber 7 taperingly extending from an outer peripheral surface of the bead core 5 toward the tread portion 4. The turnup ply 6-1 envelops the stiffener rubber 7 with its main body and turnup portion 6-1u. Among the plies constituting the carcass 6, steel cord is used at least for the turnup ply 6-1. Moreover, the cord for the turnup ply 6-1 may be an organic fiber cord such as rayon cord, nylon cord or the like. Here, the invention is described with respect to the use of the steel cord in all plies of the carcass 6.

On an outer periphery of the carcass 6 is arranged a belt 8 reinforcing the tread portion 4. The belt 8 comprises two or more layers, two cross cord layers in the illustrated embodiment, desirably two cross steel cord layers and further has an organic fiber cord layer shown by dotted lines in FIG. 1 enveloping the two cross steel cord layers, for example, a helically winding layer of nylon-66 cord or Kevlar cord. The cross steel cord layers are arranged to cross the steel cords of these layers with each other with respect to an equatorial plane E of the tire. In the illustrated embodiment, a width of the steel cord layer adjacent to the carcass 6 is wider than that of an outer steel cord layer.

The tire 1 is provided a pair of reinforcing rubber strips 9, which is inherent to a run-flat tire, each having a crescent-shaped section and located at an inner face side of the turnup ply 6-1 in the carcass 6. In order that the reinforcing rubber strip 9 stably supports the total weight of the running vehicle even at an internal pressure of zero and prevents the separation of the tire 1 from the rim and the breakage of the tire 1 and further can maintain the running stability in the sudden puncture during the high-speed running at a speed of, for example, 80–160 km/h, a middle region of the reinforcing rubber strip in the radial direction of the tire is a thick portion having a maximum gauge Gh=8–12 mm, while both end regions thereof in the radial direction are tapered. Numeral 10 is an innerliner of halogenated butyl rubber having an air impermeability. Therefore, the tire 1 is a tubeless tire.

In FIG. 1 sectionally illustrates a tire-rim assembly formed by assembling the tire 1 onto an approved rim 15 (according to the above TRA standard, shown by only a profile line) and inflated under a slight air pressure corresponding to 15% of a maximum air pressure of the tire 1 (according to the above TRA standard). The section of the assembly inflated under such a slight air pressure as a whole must satisfy the following condition.

That is, assuming a straight line L passing through a center P of an arc in a profile of a flange 15F of the rim 15 and drawn in parallel to the aforementioned rim diameter line RL, and an intersect A of a straight line Q drawn from the center P toward the tire 1 at an angle of 60° with respect to the straight line L with an inner face of the tire 1, a line segment PA connecting the center P to the intersect A is a standard line. Therefore, a top C of the stiffener rubber 7 in the radial direction of the tire 1 is located inward from the standard line PA in the radial direction of the tire 1.

This naturally means that the turnup portion 6-1u of the turnup ply 6-1 contacts with the main body of the turnup ply 6-1 inward from the standard line PA in the radial direction of the tire 1. In other words, the turnup portion 6-1u of the turnup ply 6-1 extends over the top C of the stiffener rubber 7 outward in the radial direction of the tire 1 and a part of the turnup portion 6-1u exceeding the top C of the stiffener rubber 7 is arranged to contact with the main body of the turnup ply 6-1.

The result of the inventors' investigation with respect to the tire having an aspect ratio of not less than 60 will be described below.

Figure 5:
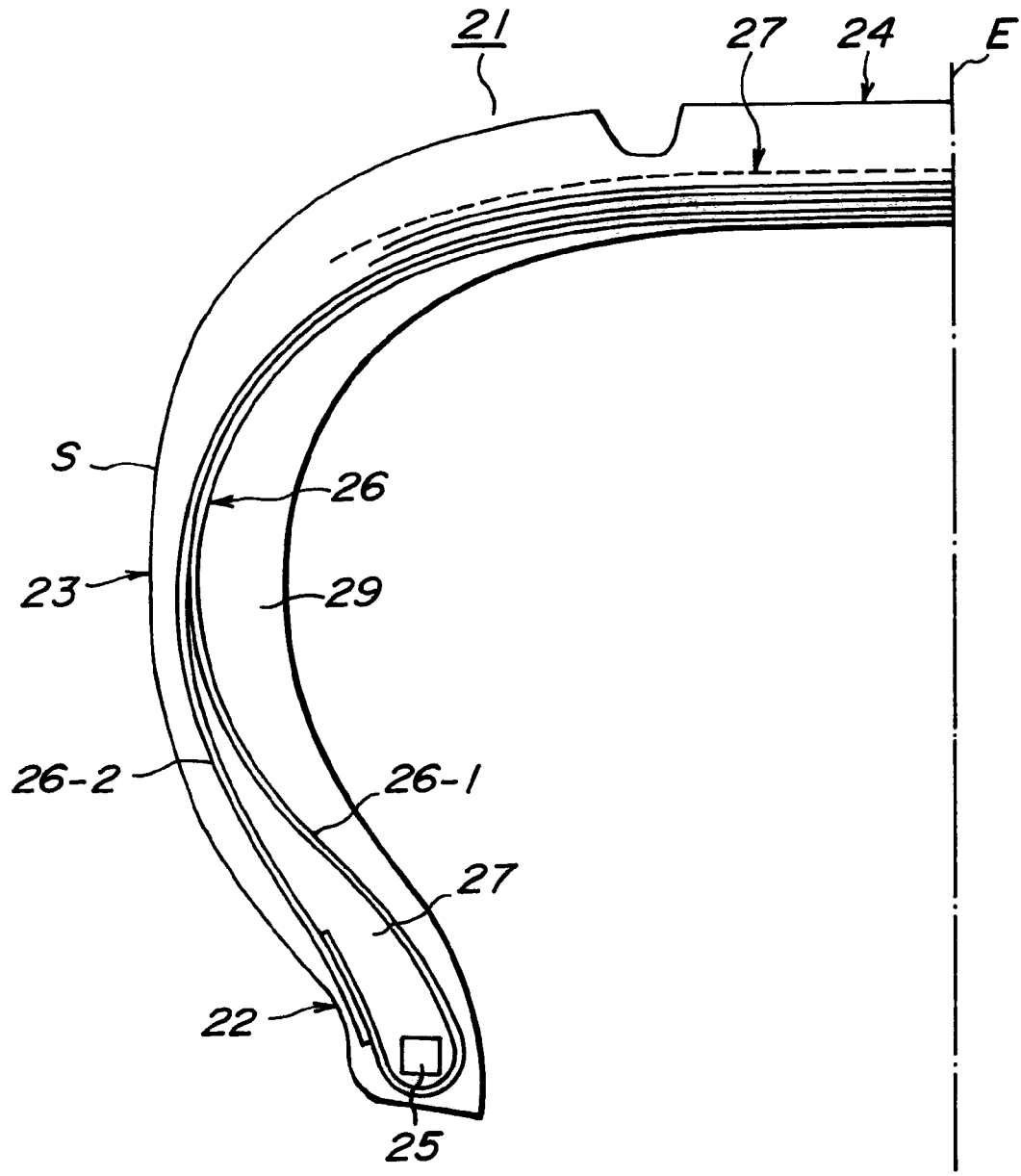
FIG. 5 is a left-half section view of an assembly of the conventional pneumatic tire with a rim.
Figure 6:
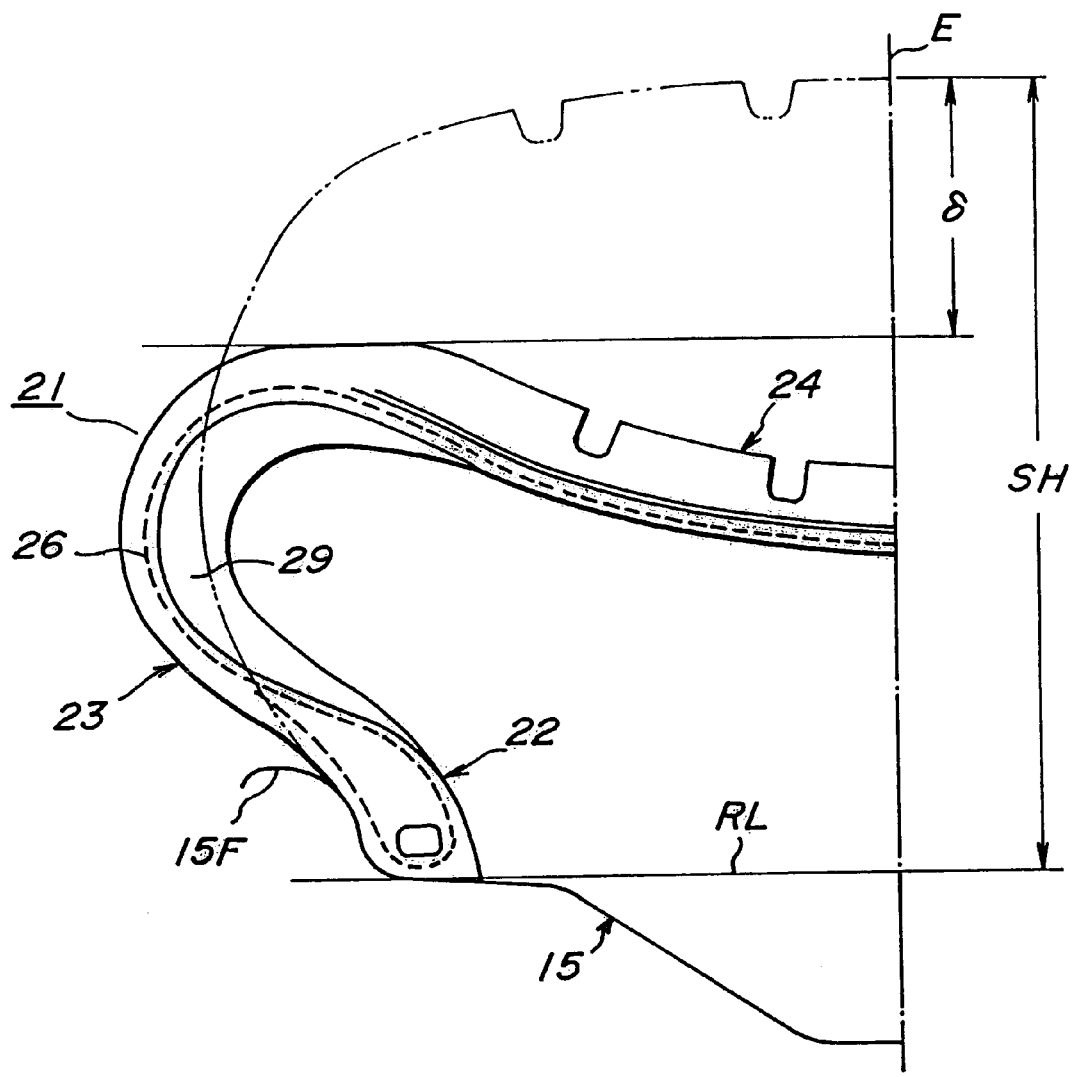
FIG. 6 is a left-half section illustrating a run-flat state of the assembly shown in FIG. 5.

Referring to FIG. 6 illustrating a flat state of the tire 21 shown in FIG. 5 under loading, the section height SH of the tire under a maximum air pressure is deformed by a large deflection $\delta$ at the flat state. As the deflection $\delta$ becomes larger, the run-flat durability lowers, while as the deflection $\delta$ becomes small, the run-flat durability improves. That is, the deflection $\delta$ is inversely proportional to the run-flat durability as mentioned below.

In order to provide a small deflection $\delta$ as far as possible, there are required (a) the bending rigidity per unit width in the circumferential direction of the tire at a tire section is made as large as possible or it is attempted to increase the bending rigidity of the cord in the carcass 6; (b) tension zone is found out in a range of from the bead portion 2 to the sidewall portion 3 and the turnup ply 6-1 and its turnup portion 6-1u and the down ply 6-2 are arranged to effectively act in this tension zone; and (c) an effect of properly controlling the bending deformation is given to the stiffener rubber 7.

As to the item (a):

In the conventional carcass 26, it is customary to use rayon cord in each of the plies 26-1 and 26-2. After there are prepared a tire 21A using steel cords (cord twisting structure: 1×5×0.15) having a bending rigidity larger than that of rayon cord in each of the turnup ply 26-1 and the down ply 26-2, a tire 21B using the conventional rayon cords, and a comparative tire 21C using polyester cords, the deflecting ratio (($\delta$/SH)×100%) of each of these tires is measured and also a test for the run-flat durability is carried out with respect to these tires. Moreover, each of these tires has the conventional structure shown in FIG. 5 and a tire size of 215/65R15.

The deflecting ratio is 37.8% in the conventional tire 21B and 38.5% in the comparative tire 21C, while that is held to 35.0% in the tire 21A (using the steel cords).

The run-flat durability is evaluated by pushing each of the tires against a drum rotating at a surface speed of 89 km/h at an internal pressure of zero (state removing a valve core) under a load of 540 kgf corresponding to about 76% of a maximum load capacity (710 kgf) of the tire and measuring a running distance until the occurrence of trouble.

The evaluation results are represented by an index on the basis that the conventional tire 21B is 100, in which the larger the index value, the better the durability. The index value of the run-flat durability is 95 in the comparative tire 21C, while that is 138 in the tire 21A using the steel cord ply in the carcass 26. These results are shown in FIG. 7 as a relation between the deflecting ratio (%) and the run-flat durability (index).

Figure 7:
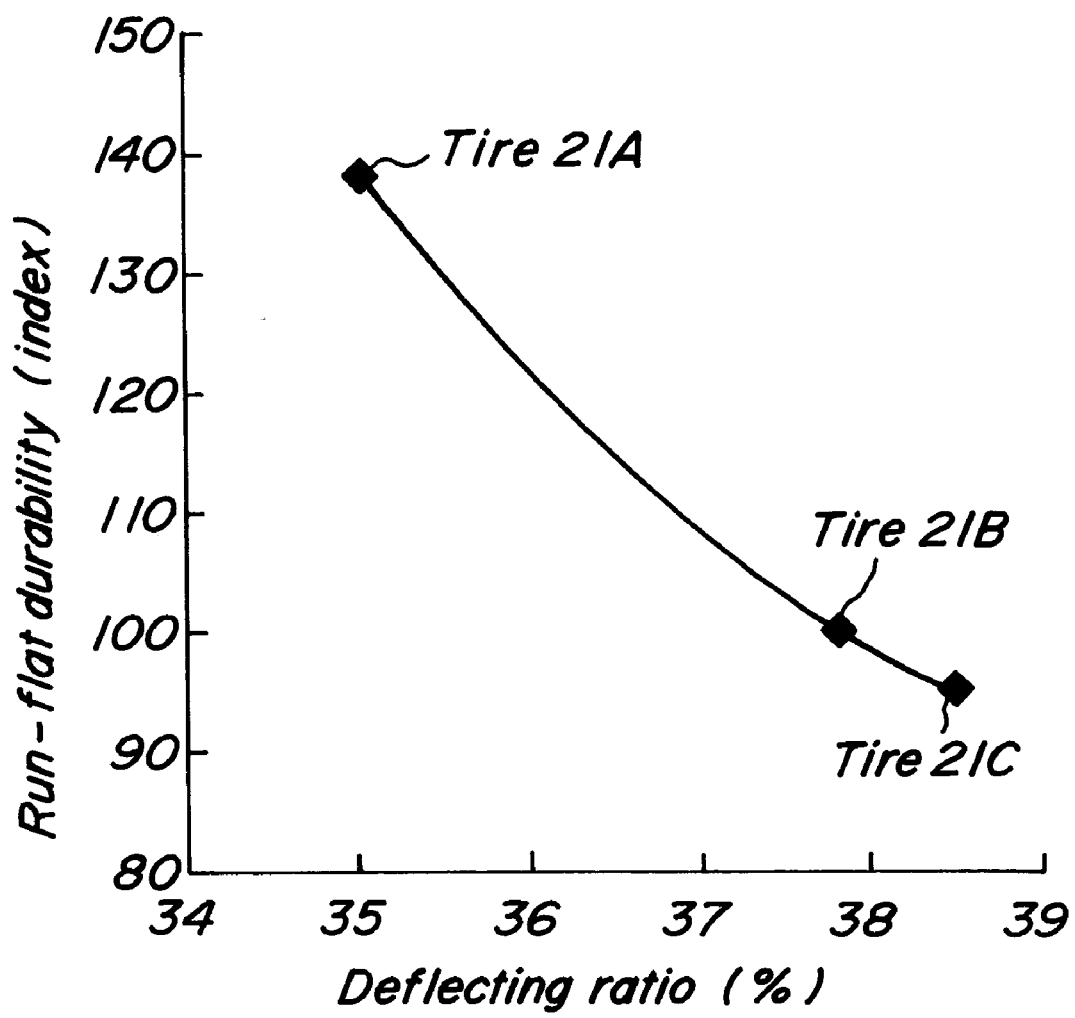
FIG. 7 is a graph showing a relation between deflecting ratio and run-flat durability.

As seen from FIG. 7, the tire 21A using the steel cords in the plies 26-1, 26-2 of the carcass 26 can make the deflecting ratio (%) smaller that those of the other tires 21B, 21C and largely improves the run-flat durability. It is apparent that the deflecting ratio (%) and the run-flat durability have substantially a relation of inverse proportion.

As to the item (b):

When the tire 21A using the steel cord ply in the carcass 26 of the conventional tire 21 shown in FIG. 5 is largely deformed at the run-flat state as shown in FIG. 6, distribution regions of tensile strain and compression strain in a direction along the ply cord are measured in a section at the run-flat deformed state. The results are shown in FIG. 8.

Figure 8:
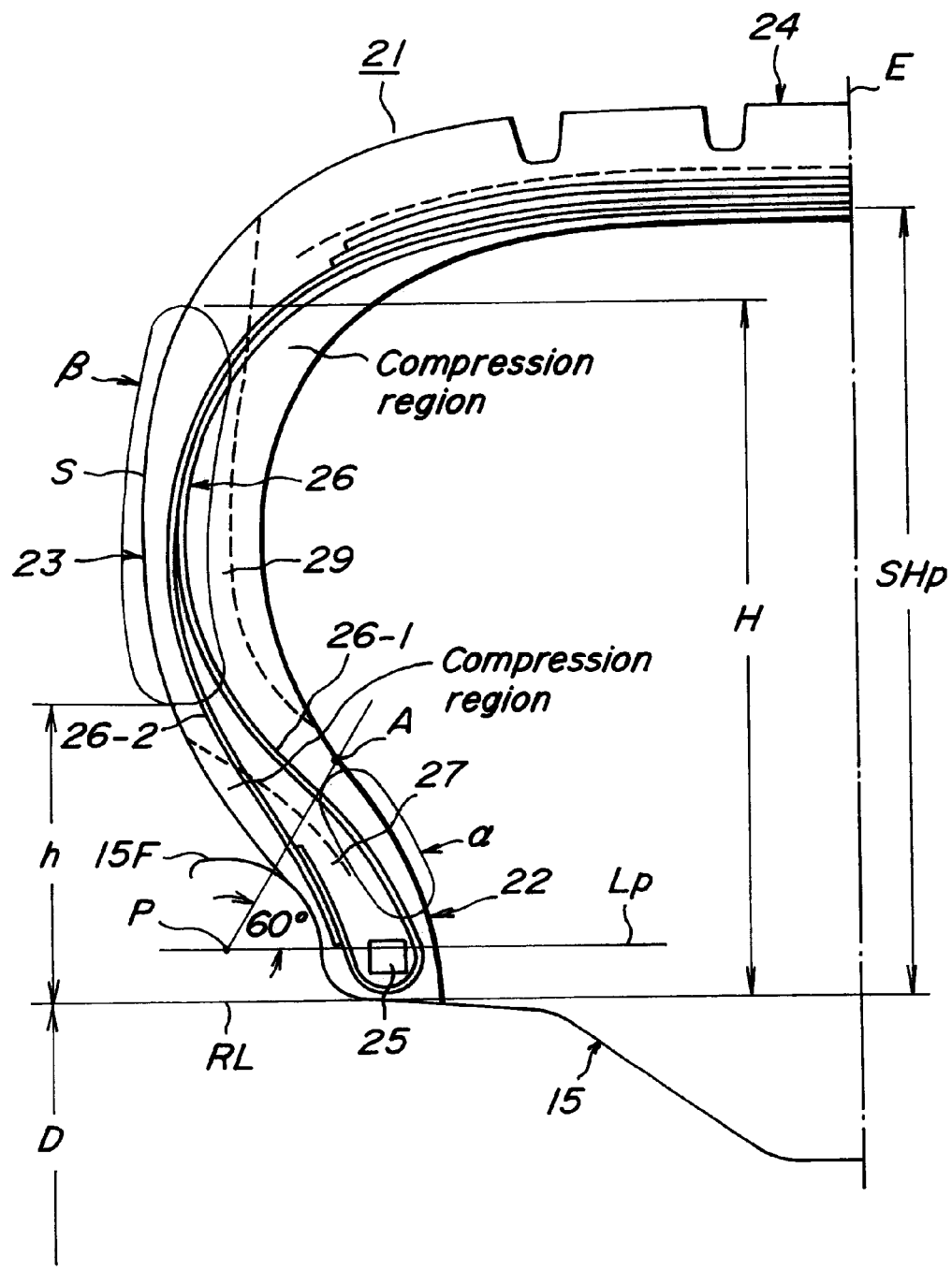
FIG. 8 is a left-half section view of the tire-rim assembly illustrating tension zone and compression zone.

As seen from FIG. 8, a tensile strain region is existent in $\alpha$ zone shown by a surrounding of a solid line inward from the line segment PA in the radial direction of the tire and at the inside of the tire in the bead portion 22 and its neighborhood. Hence a compression region is existent outward from the $\alpha$ zone and from dotted lines. Furthermore, a tensile strain region is existent in $\beta$ zone shown by a surrounding of a solid line at the outside of the tire in the sidewall portion 23 and hence a compression region is existent inward from the $\beta$ zone and from dotted lines. Also, the $\beta$ zone is a zone ranging from a position that an innermost height h from the rim diameter line RL in the radial direction of the tire is 0.35 times a height SHp of the innermost ply 26-1 from the rim diameter line RL to a position that an outermost height H from the rim diameter line RL in the radial direction of the tire is 0.90 times the height SHp.

When steel cords are used as the cord of the carcass ply existing in these $\alpha$, $\beta$ zones, a large tensile rigidity inherent to the steel cord can advantageously be utilized to reduce the deflection $\delta$ and hence it is possible to decrease the deflecting ratio (%). Particularly, in the tire having an aspect ratio of not less than 60, the range of the tensile zone $\alpha$ is wide and the value of the tensile strain is large, so that the top C of the stiffener rubber 7 is located inward from the standard line (line segment) PA (see FIGS. 1 and 2) in the radial direction of the tire 1 and the turnup portion 6-1u of the turnup ply 6-1 in the carcass 6 contacting with the main body of the turnup ply 6-1, whereby the deflecting ratio (%) of the tire 1 during the run-flat running is largely decreased to thereby considerably improve the run-flat durability. Considering the $\beta$ zone acted by the tensile strain, it is advantageous to locate the end 6-1uE of the turnup portion 6-1u of the turnup ply 6-1 in the $\beta$ zone for the reduction of the deflecting ratio (%) and the improvement of the run-flat durability.

This is inspected by a comparison of the above comparative tire 21A with ties 1 of Examples 1–3 having a structure shown in FIGS. 1 and 2. These tires have a tire size of 215/65R15. Referring to FIG. 2, a ratio (Cr/Ar) of height Cr of the top C of the stiffener rubber measured from the rim diameter line RL to height Ar of the intersect A of the standard line (line segment) PA measured from the rim diameter line RL is 0.45 in Example 1, 0.71 in Example 2 and 0.88 in Example 3.

Separately, there are provided tires of Comparative Examples 1–3, in which the ratio Cr/Ar is 1.10 in Comparative Example 1, 1.33 in Comparative Example 2 and 1.55 in Comparative Example 3.

At first, the deflecting ratio of the tire is 32.8% in Example 1, 34.0% in Example 2, 34.7% in Example 3, 35.1% in Comparative Example 1, 35.0% in Comparative Example 2, and 35.0% in Comparative Example 3. Incidentally, the deflecting ratio of the tire 21A is 35.0%. These results are plotted in FIG. 9.

Then, the test for the run-flat durability is carried out under the same conditions as mentioned above with respect to these tires. The running distance until the occurrence of trouble is represented by an index on the basis that the tire 21A is 100.

As a result, the index value of the running distance is 128 in Example 1, 110 in Example 2, 103 in Example 3, 100 in Comparative Example 1, 101 in Comparative Example 2 and 101 in Comparative Example 3. These results are shown in FIG. 10.

As seen from the above test results, the ratio Cr/Ar is adaptable to be less than 1.0, desirably 0.45–0.88.

As mentioned above, the run-flat durability of the tire 1 is largely improved by applying the steel cord to at least turnup ply 6-1 among the plies of the carcass 6, locating the top C of the stiffener rubber 7 inward from the standard line PA in the radial direction of the tire, and contacting the turnup portion 6-1u of the turnup ply 6-1 with the main body of the turnup ply 6-1 inward from the standard line PA in the radial direction of the tire.

As to the item (c):

As a result of the investigation on trouble position and trouble form of the tire 1 in Example 1 at the run-flat state, it has been confirmed that the trouble position is not the reinforcing rubber strip 9 but is the stiffener rubber 7 and the trouble form is the breakage of the stiffener rubber 7. A relation between a ratio (Gf/Gh) of a rubber gauge Gf (mm) between an outer surface of the tire 1 and an outer surface of an outermost ply of the carcass 6 or down ply 6-2 on the standard line PA to a maximum rubber gauge Gh (mm) of the reinforcing rubber strip 9 and the run-flat durability is investigated with respect to tire 1 of Examples 4–8. These tires have the same tire size as in Examples 1–3 and the test conditions are the same as mentioned above. The results are shown in Table 1. Particularly, the run-flat durability per tire weight is important and is represented by an index of durability index/weight on the basis that Example 1 is 100 in Tale 1.

TABLE 1

| Items | Examples | | | | | |
| --- | --- | --- | --- | --- | --- | --- |
|  | 1 | 4 | 5 | 6 | 7 | 8 |
| Maximum rubber gauge Gh (mm) | 11.2 | 11.2 | 11.2 | 11.2 | 11.2 | 11.2 |
| Rubber gauge Gf (mm) | 8.1 | 6.0 | 10.0 | 11.8 | 13.7 | 15.2 |
| Ratio Gf/Gh | 0.72 | 0.54 | 0.90 | 1.05 | 1.22 | 1.36 |
| Deflecting ratio (%) | 32.8 | 34.5 | 32.0 | 31.8 | 31.7 | 31.7 |
| Tire weight (kgf) | 19.44 | 18.50 | 20.28 | 21.08 | 21.87 | 22.40 |
| Run-flat durability (index) | 100 | 84 | 117 | 121 | 120 | 121 |
| Durability index/weight (index) | 100 | 88 | 112 | 111 | 106 | 105 |
| Trouble position | rubber 7 | rubber 7 | rubber 7 | rubber 9 | rubber 9 | rubber 9 |

As seen from Table 1, when the rubber gauge Gf is brought near to the maximum rubber gauge Gh of the reinforcing rubber strip 9, the deflecting ratio (%) is decreased and the run-flat durability is improved by the decreased quantity, but the trouble is still created in the stiffener rubber 7. On the other hand, when rubber gauge Gf exceeds the maximum rubber gauge Gh, the decreasing degree of the deflecting ratio tops out and the improvement of the run-flat durability is not so conspicuous and the trouble position shifts to the reinforcing rubber strip 9. Also, when the ratio Gf/Gh exceeds 1.0, the run-flat durability is saturated.

The results are plotted in FIGS. 11–13. As seen from Table 1 and FIGS. 11–13, the optimum value of the ratio Gf/Gh for the run-flat durability per tire weight is about 1.1, and an adaptable range of the ratio Gf/Gh is 0.8–1.4.

The cord twisting structure of the steel cord used in the carcass 6, 26 of the aforementioned tire is 1×5×0.15. Moreover, the steel cord having a cord twisting structure of 1×n (n is an integer of 2–7) and a filament diameter of 0.125–0.275 mm is suitable for the plies 6-1, 6-2 in the carcass 6 of the tire 1.

The steel cord used in the invention is favorable to have a high elongation property that total elongation at break of a cord at a bare state (according to JIS G3510-1986) is not less than 3.5%, desirably not less than 4.0%. However, the steel cord must satisfy a property based on the following test.

In FIGS. 3 and 4, a ratio of total area of steel filaments occupied in an area of a cord composite excluding a portion projected from an outermost filament (area occupying ratio R) in a length of 15 mm in a longitudinal direction optionally selected from the X-ray photograph of one steel cord-rubber composite, which is taken out from the plies 6-1, 6-2 of the carcass 6, is within a range of 0.45–0.95. The length of 15 mm in the longitudinal direction of the cord means 15 mm as a cord length in the X-ray photograph. The area occupying ratio R is represented by R=F/A when an area of cord-rubber composite (shadowed portion) as a whole is A and an area of total filaments occupied in the composite is F.

In case of the carcass 6 of one ply, the area occupying ratio R is an average of 10 measured values when an X-ray is irradiated to the sidewall portion 3 in the vicinity of a position S of a maximum width of the tire 1 from a direction perpendicular to the surface of the sidewall portion 3 at 10 places in the circumferential direction of the tire by using K-2 model made by Softec Co., Ltd. to obtain 10 X-ray photographs. When the carcass 6 is comprised of two plies, it is difficult to conduct an accurate measurement because the steel cord-rubber composites in these plies overlap with each other, so that after each ply is taken out from the tire 1, the X-ray photograph with respect to the each ply is obtained in the same manner as mentioned above to determine the area occupying ratio R as an average of 10 measured values.

When the area occupying ratio R is less than 0.45, a contact area between each filament and rubber increases to more control corrosion propagation through water content, but a tensile modulus as the steel cord becomes too low and hence the bending rigidity required in the carcass 6 can not be satisfied, while when the area occupying ratio R exceeds 0.95, the filament itself hardly deforms and the resistance to compression fatigue is degraded. Moreover, the area occupying ratio R is preferably within a range of 0.50–0.90, more particularly 0.55–0.75.

The steel cord used in the plies 6-1, 6-2 of the carcass 6 is a so-called open twisted cord having a wide space in an inside of an outer cord envelop in which the filaments are substantially independent in rubber matrix and contact with each other in a point. In the open twisted cord having a given area occupying ratio R, the contact area between each filament of the cord and rubber can be increased to a maximum to control the abrasion due to the friction between the mutual filaments or fretting. Also the penetration of water into a space between mutual filaments of the cord can be prevented and hence the corrosion propagation through water mainly resulted in the degradation of the durability in the steel cord can be controlled to largely improve the corrosion resistance. In addition, a greater amount of rubber existing in the inside of the steel cord contributes to increase the bending rigidity of the steel cord.

As mentioned above, according to the invention, there can be provided pneumatic tires having particularly an aspect ratio of not less than 60 which hold a good rim-assembling property without using the tire support member and maintain the ride comfort against vibrations at an acceptable range without considerably raising the cost and damaging the productivity in the building operation in view of the production, and guarantee the safe running of the vehicle such as passenger car or the like even in the rapid air leakage due to puncture or the like and can improve the performance of preventing the separation of the tire from the rim and the durability in the run-flat running to levels satisfied by a user as a run-flat tire.

What is claimed is:

1. In a pneumatic tire comprising a radial carcass of at least one rubberized cord ply extending between a pair of bead cores embedded in a pair of bead portions and reinforcing a pair of sidewall portions and a tread portion, a stiffener rubber taperingly extending from an outer peripheral surface of the bead core toward the tread portion, said carcass comprising a turnup ply wound around the bead core from inside of the tire toward outside thereof so as to envelop the stiffener rubber, and a pair of reinforcing rubber strips each having a crescent-shaped cross-section and extending along an inner face side of an innermost turnup ply from a position near to the bead core in the bead portion through the sidewall portion to an end part of the tread portion, the improvement wherein at a cross-section of a tire-rim assembly when the tire is assembled onto an approved rim and inflated under an internal pressure corresponding to 15% of a maximum air pressure for the tire, a top of the stiffener rubber is located inward in a radial direction of the tire from a line segment PA connecting a center P of an arc in a flange profile of the rim to an intersection point A of a straight line drawn from the center P toward the tire at an angle of 60° with respect to a straight line parallel to a rim diameter line with an inner face of the tire.

2. A pneumatic tire according to claim 1, wherein a cord at least used for the turnup ply of the carcass is a steel cord.

3. A pneumatic tire according to claim 2, wherein the steel cord for the turnup ply has a cord twisting structure of 1×n where n is an integer of from 2–7, and a filament diameter of the steel cord is within a range of 0.125–0.275 mm.

4. A pneumatic tire according to claim 1, wherein a turnup portion of the turnup ply is contacted with a main body of the turnup ply inward from the line segment PA in the radial direction of the tire.

5. A pneumatic tire according to claim 4, wherein the turnup portion of the turnup ply extends over the top of the stiffener rubber and is contacted with the main body of the turnup ply at a position exceeding the top of the stiffener rubber.

6. A pneumatic tire according to claim 1, wherein a ratio of rubber gauge Gf between an outer surface of the tire and an outer surface of an outermost ply on the line segment PA to maximum gauge Gh of the reinforcing rubber strip (Gf/Gh) is within a range of 0.8–1.4.

* * * * *